(12) United States Patent
Ezumi et al.

(10) Patent No.: US 6,659,330 B2
(45) Date of Patent: Dec. 9, 2003

(54) FRICTION STIR WELDING METHOD, AND METHOD FOR MANUFACTURING CAR BODY

(75) Inventors: Masakuni Ezumi, Kudamatsu (JP); Kazushige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 10/084,416

(22) Filed: Feb. 28, 2002

(65) Prior Publication Data

US 2002/0125298 A1 Sep. 12, 2002

Related U.S. Application Data

(62) Division of application No. 09/915,354, filed on Jul. 27, 2001, now Pat. No. 6,530,513.

(30) Foreign Application Priority Data

Jan. 17, 2001 (JP) ........................................ 2001-009035

(51) Int. Cl.[7] ............................................... B23K 20/12
(52) U.S. Cl. .................................................. 228/112.1
(58) Field of Search ........................... 228/112.1, 114.5, 228/119, 189, 234.1, 2.1; 156/73.1

(56) References Cited

U.S. PATENT DOCUMENTS 6,250,037 B1 * 6/2001 Ezumi et al. ............... 52/592.1
6,276,591 B1 * 8/2001 Kawasaki et al. ........ 228/112.1
6,530,513 B2 * 3/2003 Ezumi et al. ............. 228/112.1

* cited by examiner

Primary Examiner—Tom Dunn
Assistant Examiner—Jonathan Johnson
(74) Attorney, Agent, or Firm—Antonelli, Terry, Stout & Kraus, LLP

(57) ABSTRACT

A cutting tool 60 cuts along the butted portion between two members 10, 20. A filling material 30 is inserted to the gap 40 formed by said cutting, and a roller 70 presses protrusions 12 and 22 to crimp said protrusions 12 and 22 so as to fix said filling material to position. Next, friction stir welding is performed to the protrusions 12, 22 and the filling material 30 using a rotary tool 80. In another example, instead of cutting, the filling material can be welded and filled to the gap. In yet another example, cutting can be performed so as to approximate the two members before performing the friction stir welding step.

25 Claims, 13 Drawing Sheets

FRICTION STIR WELDING METHOD, AND METHOD FOR MANUFACTURING CAR BODY

This application is a Divisional application of application Ser. No. 09/915,354, filed Jul. 27, 2001, now U.S. Pat. No. 6,530,513.

FIELD OF THE INVENTION

The present invention relates to a friction stir welding method. Especially, it relates to a welding method appropriate for manufacturing the body of a car that runs on rails, such as a railway car.

DESCRIPTION OF THE RELATED ART

Friction stir welding method is a method for bonding members by inserting a round shaft (called a rotary tool) to a joint portion and moving the tool along the joint line while rotating the tool, so as to heat, soften and plasticize the joint portion thereby performing solid-phase bonding of the members. The rotary tool comprises a large-diameter portion and a small-diameter portion. The small-diameter portion is inserted to the members to be bonded, and the end surface of the large-diameter portion comes into contact with the members. The small-diameter portion is provided with a screw. Moreover, a protrusion is formed to the butted portion of the two members to be bonded together, and the rotary tool is inserted from the side provided with this protrusion so that the metal constituting the protrusion fills the gap between the two members. The large-diameter portion of the rotary tool is inserted to the protrusion. When friction stir welding hollow members, the connecting plate that connects two face plates is used as the supporting board when friction stir welding the hollow members together. These methods are disclosed for example in Japanese Patent Publication No. 3070735 (U.S. Pat. No. 6,050,474) and Japanese Patent Laid-Open Publication No. 2000-334581 (EP1055478A1).

Moreover, Japanese Patent Laid-Open Publication No. 2000-233285 discloses in FIG. 14 a method for friction stir welding two members while positioning a filling member in the gap formed between the two members. Furthermore, Japanese Patent Laid-Open Publication No. 2000-167677 (EP0992314A2) discloses a friction stir welding method for welding a first member having a protrusion with a second member not having a protrusion, wherein intermittent buildup welding is performed to the second member before performing the friction stir welding.

SUMMARY OF THE INVENTION

When a gap exists between the two members to be welded, it is very difficult to perform friction stir welding. Therefore, a protrusion is formed to the surface of the member where the rotary tool is to be inserted, so as to fill the gap with the metal constituting the protrusion. However, in reality when the gap exceeds 1 mm for example, it is difficult to obtain a good joint. It may be possible to increase the diameter of the rotary tool as the gap widens, but this may cause other inconveniences.

The car body of a railway car and the like that runs on rails include side structures that constitute the inner side surfaces of the vehicle, a roof structure, and an underframe that forms the floor. The first step for manufacturing a car body is to manufacture the side structures, the roof structure, and the underframe, respectively, by bonding plural extruded members. Next, these structures are bonded to form the car body. The size of each side structure, roof structure and underframe is approximately 20 m in length and 3 m in width, so there is a possibility of a large fabrication error. This error causes the gap of the joint portion to easily exceed 1 mm. The object of the present invention therefore is to obtain a good weld even when a large gap exists.

The second object of the present invention is to provide a simple friction stir welding method for bonding the underframe and the side structures of the car body, and for bonding the side structures and the roof structure thereof.

The objects mentioned above are achieved by positioning a member for filling the gap to the gap existing in the butted portion between two members, and then performing friction stir welding thereto.

Moreover, the member for filling the gap can be arranged in a gap formed by cutting the butted portion of the two members.

Even further, the butted portion of the two members can be cut and the two members can be moved closer together before performing friction stir welding thereto.

As for the second object of providing a simple friction stir welding method for welding the underframe and the side structures, either the surface plate of the underframe is used as supporting means, or a supporting device is arranged between two side structures, thereby facilitating the process.

The friction stir welding of the side structures and the roof structure is facilitated by providing a support device between the two side structures.

DETAILED DESCRIPTION OF PREFERRED EMBODIMENTS

Figure 1:
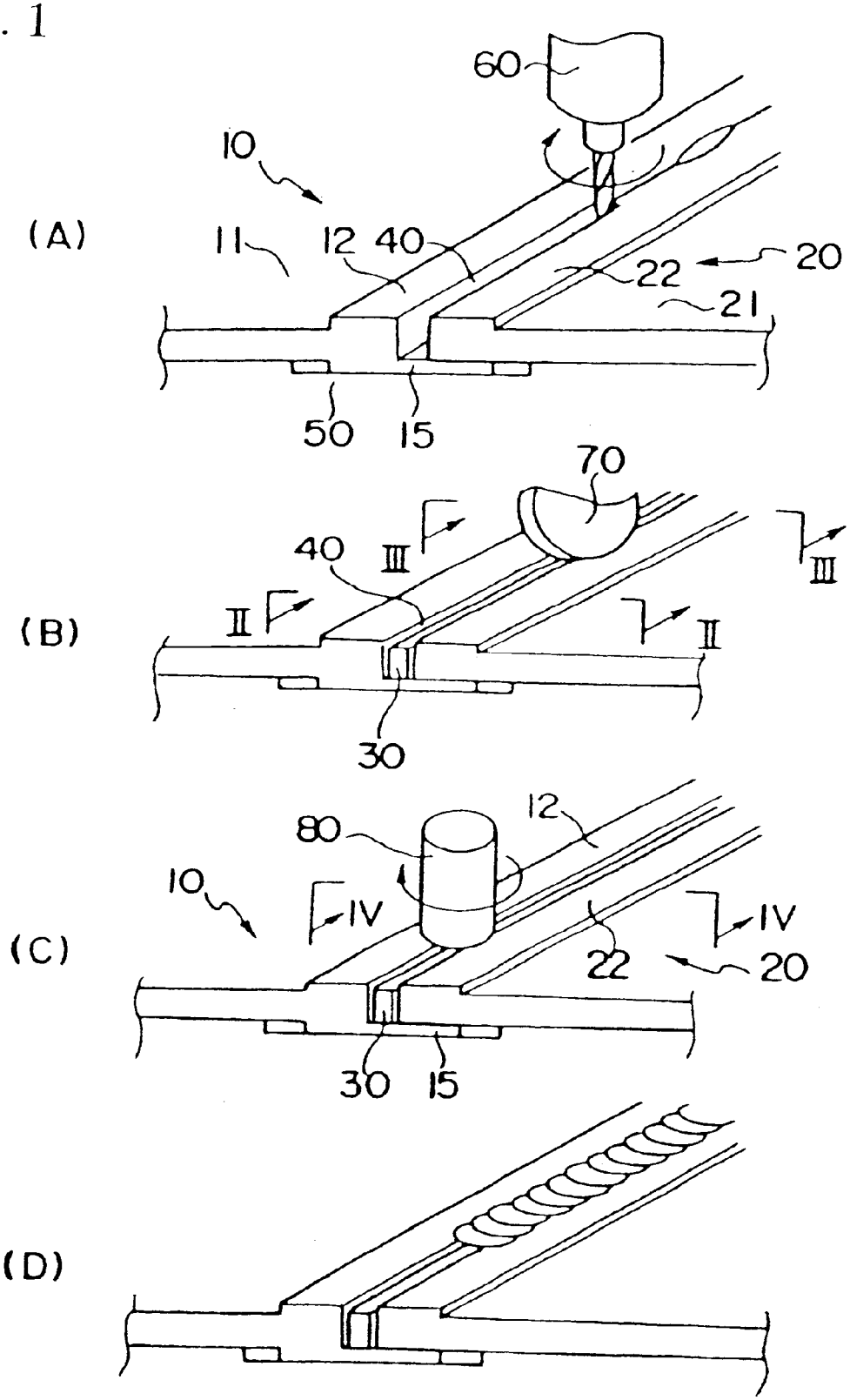
FIG. 1 shows the steps f or welding two members according to one embodiment of the present invention.
Figure 2:
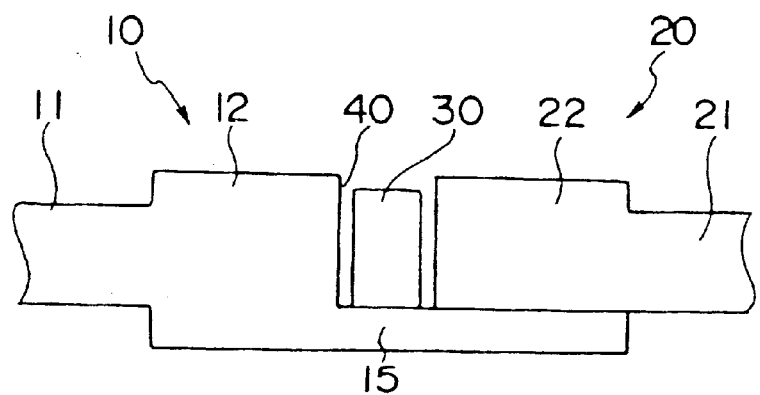
FIG. 2 is a cross-sectional view taken at line II—II of FIG. 1.
Figure 3:
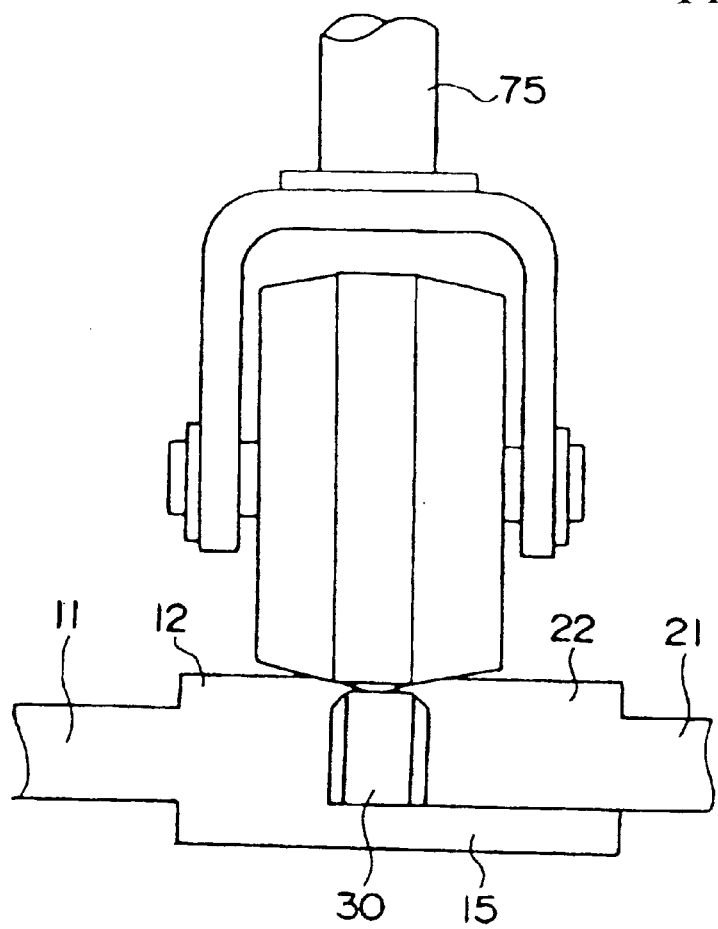
FIG. 3 is a cross-sectional view taken at line III—III of FIG. 1.
Figure 4:
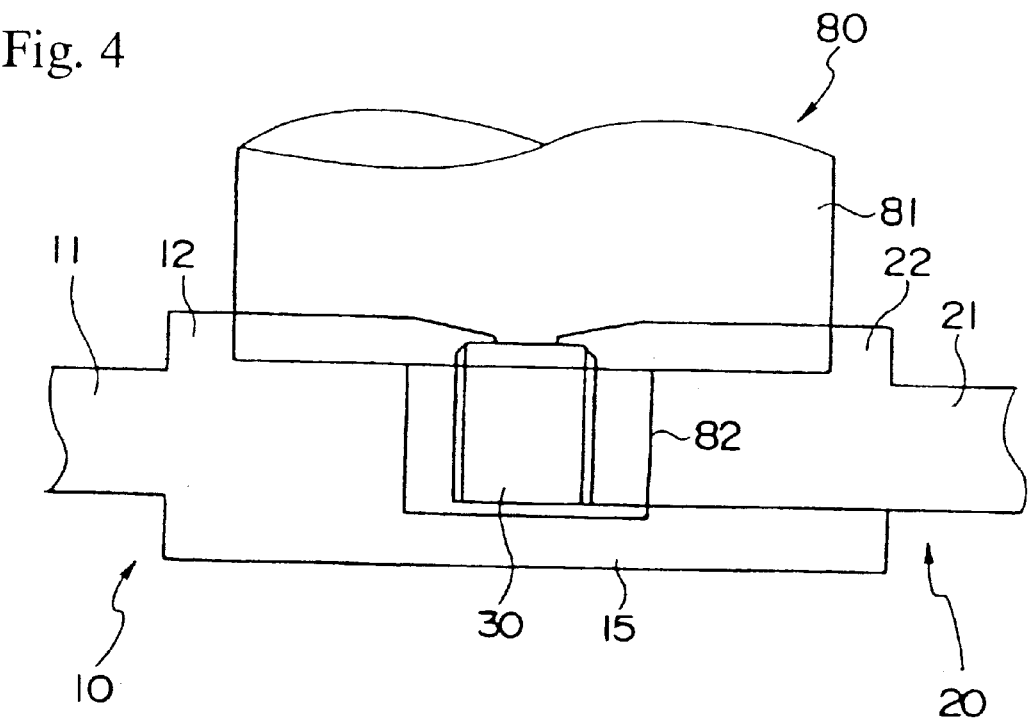
FIG. 4 is a cross-sectional view taken at line IV—IV of FIG. 1.

First, the basic embodiment of the present invention will be explained with reference to FIGS. 1 through 4. FIG. 1 shows the welding operation in steps performed in order from (A) to (D).

In FIG. 1(A), two plate-shaped members 10 and 20 are mounted on a base 50 and butted to each other. The two members 10 and 20 are butted so as to minimize the gap between them. The member 10 comprises a protruding block 15 along the butted portion against the member 20, and the member 20 rests on the block 15. Protrusions 12 and 22 are formed respectively on the upper surfaces of the butted portion of members 10 and 20. At this state, the members 10 and 20 are fixed to the base 50 using a binding equipment (not shown). The members 10 and 20 are made of aluminum alloy. The butted portion will hereinafter be called the joint line.

After the members are bound as above, the butted surface of the two members 10 and 20 are cut from above using a cutting tool 60. This forms a gap (groove) 40 having a constant width to the butted surfaces. The width of the cut (gap, groove) 40 is greater than the gap that existed when the members 10 and 20 were butted. The bottom surface of the gap 40 (the bottom of the cut) does not go below the upper surface of the protruding block 15. (FIG. 1(A)).

A sensor is used to detect the width of the two protrusions 12 and 22, and the center of the cutting tool 60 is placed to the center of the detected width, thereby performing the cutting process. The insertion depth of the cutting tool 60 is controlled to a fixed depth by detecting the position of the upper surface of the protrusions 12 and 22. The cutting is performed as dry cutting. The swarf is either blown away by compressed air or aspirated by a dust collector. The cutting tool 60 shown in FIG. 1 is an end mill, but a circular saw can be used instead.

Next, a filling material 30 is arranged in the gap 40 formed by the cutting process. The height of the filling material 30 is set so that the upper surface of the material 30 is positioned below the upper surface of the protrusions 12 and 22. The upper surface of the filling material 30 is positioned above the line extended from the upper surface of the plates 11 and 21 of members 10 and 20 excluding the protrusions 12 and 22. The width of the filling material 30 should preferably be as close to the width of the gap 40 as possible, but still easy to insert to the gap. The difference in the width of the gap 40 and the width of the filling material 30 is less than 1 mm. (FIG. 1(B), FIG. 2).

Next, the upper surfaces of the protrusions 12 and 22 close to the gap 40 are pressed from above, and the corners of the protrusions 12 and 22 are bent toward the gap 40. Thereby, the filling material 30 is pressed downward, and fixed to the members 10 and 20. The fixation prevents the filling material 30 from moving when the rotary tool 80 performs the friction stir welding.

This crimping process is performed by running a roller 70 along the gap 40. The tip of the roller is formed into a trapezoid shape. The center of width of the roller 70 is positioned to the center between the two members 10 and 20 (center of the gap 40). The sloped surfaces of the roller 70 presses the corner of the protrusions 12 and 22. Thereby, the corners of protrusions 12 and 22 are crimped. A sensor detects the width of the two protrusions 12 and 22, and the center of the roller 70 is positioned to the center thereof, and the roller is pressed. (FIG. 1(B), FIG. 3).

The roller 70 presses the protrusions 12 and 22 toward the groove 40 with predetermined power provided by an air cylinder 75. The air cylinder 75 can expand and contract freely so as to correspond to the height variation of the protrusions 12 and 22. If beads from a tack weld explained in the following exist, the roller 70 can run over them.

Next, a rotary tool 80 is inserted to the butted portion from above, thereby friction stir welding the three members together, which are the members 10 and 20 and the filling material 30. The rotary tool 80 moves along the joint line. The tip of the small-diameter portion 82 of the rotary tool 80 reaches the protruding block 15. The diameter of the small-diameter portion 82 is greater than the width of the gap 40. A sensor detects the width of the two protrusions 12 and 22, and the center of the rotary tool 80 is positioned at the center thereof when performing the friction stir welding. The insertion depth of the rotary tool 80 is controlled to a fixed depth by detecting the upper surface position of the protrusions 12 and 22. (FIGS. 1(C) and (D), FIG. 4).

If necessary, after friction stir welding, the joint portion and the protrusions 12 and 22 protruding from the upper surface of the plates 11 and 12 are cut off, to form a smooth flat surface.

One example of the size of each member will now be explained. The width of the gap 40: 3 mm; the depth of the gap 40: 6 mm; the thickness of plates 11 and 21: 4 mm; the height of the protrusions 12 and 22 (excluding the portion of plates 11 and 21): 2 mm; the width of protrusions 12 and 22: 8 mm; the width of the filling material 30: 2.5 mm; the height of the filling material 30: 5.5 mm; the diameter of the large-diameter portion 81 of the rotary tool 80: 15 mm; the diameter of the small-diameter portion 82: 6 mm; the tilt angle of the rotary tool 80: 4°. When performing friction stir welding, the boundary between the large-diameter portion 81 and the small-diameter portion 82 (more precisely, the lowest end of the large-diameter portion 81) is positioned between the upper surface of the plates 11 and 21 and the upper surface of the filling material 30.

According to this embodiment, even if a gap exceeding 1 mm exists along the joint line when two members are butted together, the cutting process expands the gap to a predetermined size, and next the filling material 30 is positioned thereto reducing the gap to less than 1 mm, before the friction stir welding is performed. Therefore, a good weld is obtained. The gap between the filling material 30 and the gap 40 corresponding to the thickness of the plates 11 and 21 is filled using the metal forming the protrusions 11 and 21 and the upper part of the filling material 30 as source material.

If the filling material 30 is not sufficiently fixed to positioned by the crimping, an arc welding can be performed to intermittently tack weld the filling material 30 to the protrusions 11 and 21.

Figure 5:
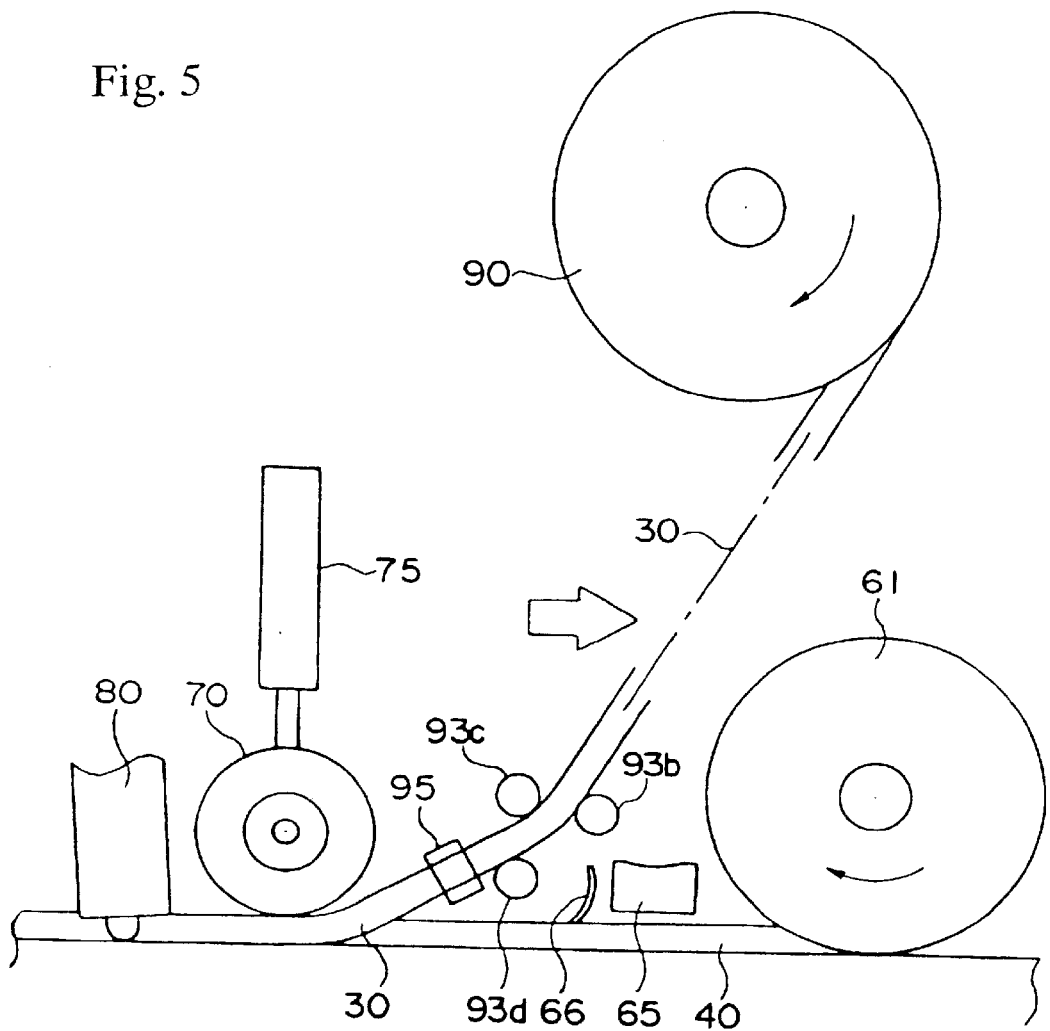
FIG. 5 is a view of the welding device according to another embodiment of the present invention.
Figure 6:
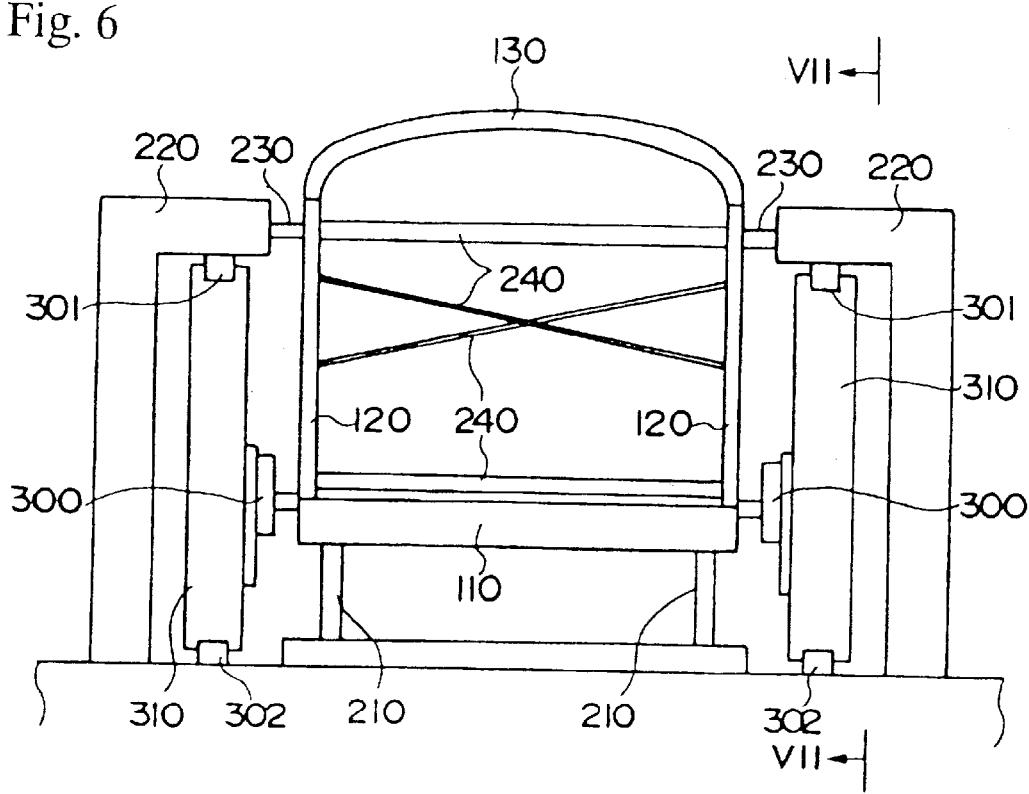
FIG. 6 is a front view of the welding device according to another embodiment of the present invention.
Figure 7:
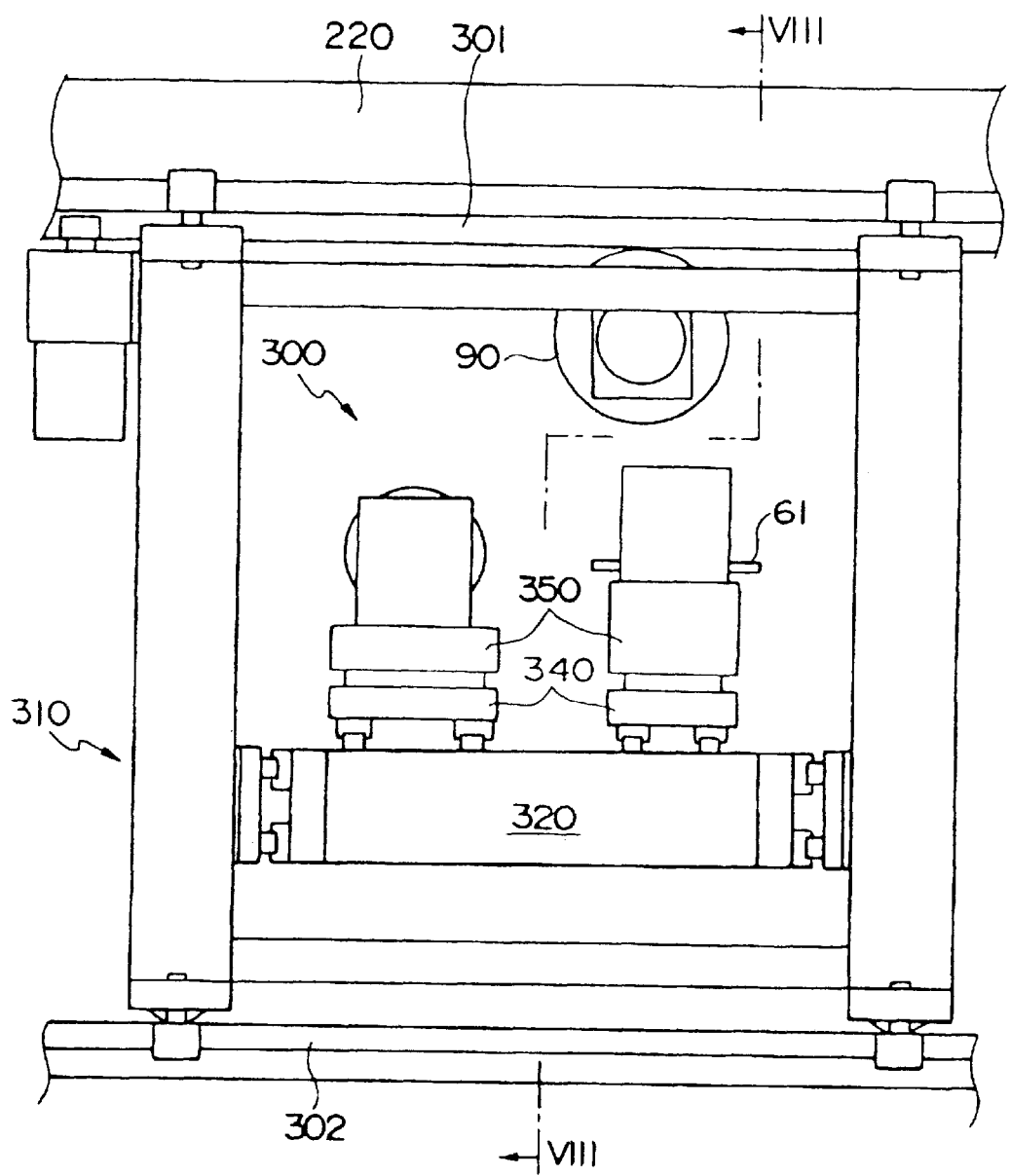
FIG. 7 is a cross-sectional view taken at line VII—VII of FIG. 6.
Figure 8:
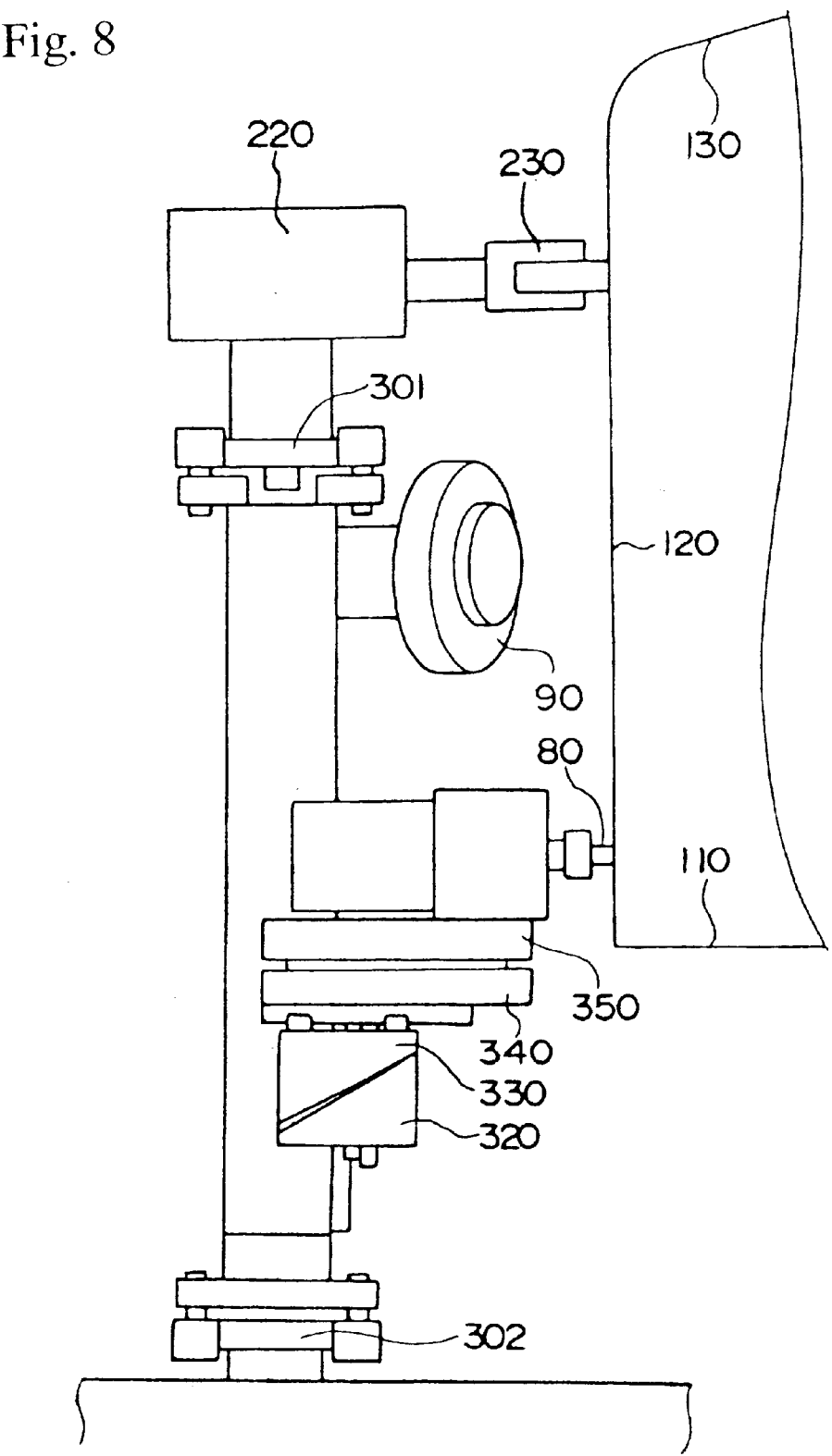
FIG. 8 is a cross-sectional view taken at line VIII—VIII of FIG. 7.

Next, the embodiment of FIG. 5 will be explained. Reference 61 is a circular saw used as the cutting tool 60. Behind the circular saw 61 is a suction opening 65 that aspirates the swarf. Further, a rubber plate 66 prevents the swarf from moving downstream. The filling material 30 is spooled around a drum 90. The filling material from the drum 90 is smoothly bent into an arc-shape by guide rollers 93*b*, 93*c* and 93*d*, and travels through a cylindrical guide 95 before being inserted to the gap 40. Such rollers 93*b*, 93*c* and 93*d* and the guide 95 are appropriately positioned between the drum 90 and the roller. When the filling material 30 is positioned in the gap 40, it is fixed thereto by the roller 70, and friction stir welding is performed by the rotary tool 80. These devices are mounted on a single track. As the track moves, the drum 90 reels off the filling material 30.

Upon crimping the protrusions 12 and 22 to fix the filling material 30, it is preferable to first weld the end portion of the filling material 30 to the protrusions 12 and 22.

According to this embodiment, the roller 70 inserts the filling material 30 into the gap 40 is also the roller 70 that crimps the protrusions 12 and 22, but independent rollers can be used for the two purposes. The roller that inserts the filling material 30 to the gap 40 presses the upper surfaces of the filling material 30.

Further, the roller 70 is used to crimp the protrusions 12 and 22 to fix the filling material 30, but in stead, the upper surface of the filling material 30 can be pressed and fixed by the roller 70. Further, the upper surface of the filling material 30 can protrude above the upper surface of the protrusions 12 and 22. It is preferable to mount plural rollers 70 along the direction that the track runs, so as to fix the material securely.

According further to the present embodiment, the roller 70 is used to press the protrusions 12 and 22, but instead, the two protrusions 12 and 22 can be hammered intermittently. The hammering member should have a small cross-sectional area, such as a chisel. Moreover, the swarf generated when cutting the groove 40 can be removed by blowing compressed air thereto.

If hairline finishing is to be performed to the surface after the friction stir welding is performed and the surface is smoothed out, the filling material 30 should be the same material forming the base members 10 and 20. If a filling material that is different from the material of the base members is used, and hairline finishing is performed without painting the welded portion, the joint portion can be discolored, and the appearance is deteriorated. However, if the filling material utilizes the same material as the base members, less discoloration occurs, and the appearance is improved.

Next, another embodiment will be explained with reference to FIGS. 6 through 9. This embodiment applies the present method to manufacture the car body of a vehicle that runs on rails, such as a railway car. The car body of the railway car comprises for example an underframe 110 constituting the floor of the car, the side structures 120, 120 constituting the side surfaces thereof, and a roof structure 130 constituting the roof of the car. First, the roof structure 130 is mounted on the upper portion of one pair of side structures 120, 120, and then they are welded and integrated. Then, the body is mounted on the underframe, which are then welded together. The following is an explanation of a friction stir welding device that welds the underframe to the side structures.

The underframe 110 is mounted on and fixed to a base 210. The side structures 120, 120 are mounted on the underframe 120. A roof structure 130 is welded onto the upper area of the side structures 120, 120. After welding the side structures 120, 120 and the roof structure 130, the welded body is mounted on the underframe 120.

The upper areas of the side structures 120, 120 are supported by a supporting device 230. The supporting device 230 is mounted on a frame 220 positioned along both side surfaces of the car body. The supporting device 230 can expand and contract in the horizontal direction. A supporting device 240 is arranged to the inner side of the car body for setting the interval between the pair of side structures 120 and 120 to a predetermined size and for setting the vertical degree of the structures 120, 120. The supporting device 240 is positioned between the upper portions of the side structures 120, 120, the lower portions thereof, and between the upper portion and the lower portion thereof. The supporting device 240 can be support bars for increasing the interval between the side structures 120 and 120, or chains for reducing the interval thereof. Each are equipped with a turnbuckle, enabling to vary the interval. The chain should be hooked on a window and the like to pull the structure. Further, the lower end of the side structures 120 are pressed from the exterior of the vehicle body toward the inner direction.

Welding devices 300, 300 are positioned next to both side surfaces of the car body. The upper and lower ends of each welding device 300 is supported by rails 301, 302 which run linearly along the car body. The welding device 300 is positioned on a track 310. The welding device 300 is mounted to the lower rail 301 via a roller, and is further equipped with a roller that contacts the left and right sides of the rail. The upper area of the welding device 300 is equipped with a roller that contacts the left and right sides of the rail. The rail 302 is formed on the upper portion of the frame 220.

The welding device 300 is the equipment disclosed in the previous embodiment. The welding device 300 is placed on an elevating platform 320 of the track 310. The elevating platform 320 moves up and down guided by the poles on the left and right sides of the square frame of the track 310. A seat 330 that rotates in the vertical direction is positioned at the upper area of the elevating platform 320. On the upper surface of the rotary seat 330 is a seat 340 that moves in the horizontal direction. On the upper surface of the moving seat 340 is placed a seat 350 that moves up and down. The equipment disclosed in the previous embodiment is mounted on these up/down seats 350, 350. That is, on one seat 350 is mounted the circular saw 61, the driving device thereof, the suction opening 65, the plate 66, the sensor and the like. On the other seat 350 is mounted the rollers 70, 93b, 93c, 93d, the guide 95, the rotary tool 80, the driving device thereof, the sensor and the like. On the upper portion of the track 310 is positioned the drum 90.

Each of the above-mentioned sensors detect the width and the position of the protrusions, based on which the horizontal movement seat 340 and the up/down seat 350 are moved in order to control the position and the depth of the circular saw 61 and the rotary tool 80. The horizontal movement seat 340 changes the distance from the car body.

The rotary seat 330 is used when the shape of the portion of the car vehicle to be welded is tilted from the vertical surface.

Figure 9:
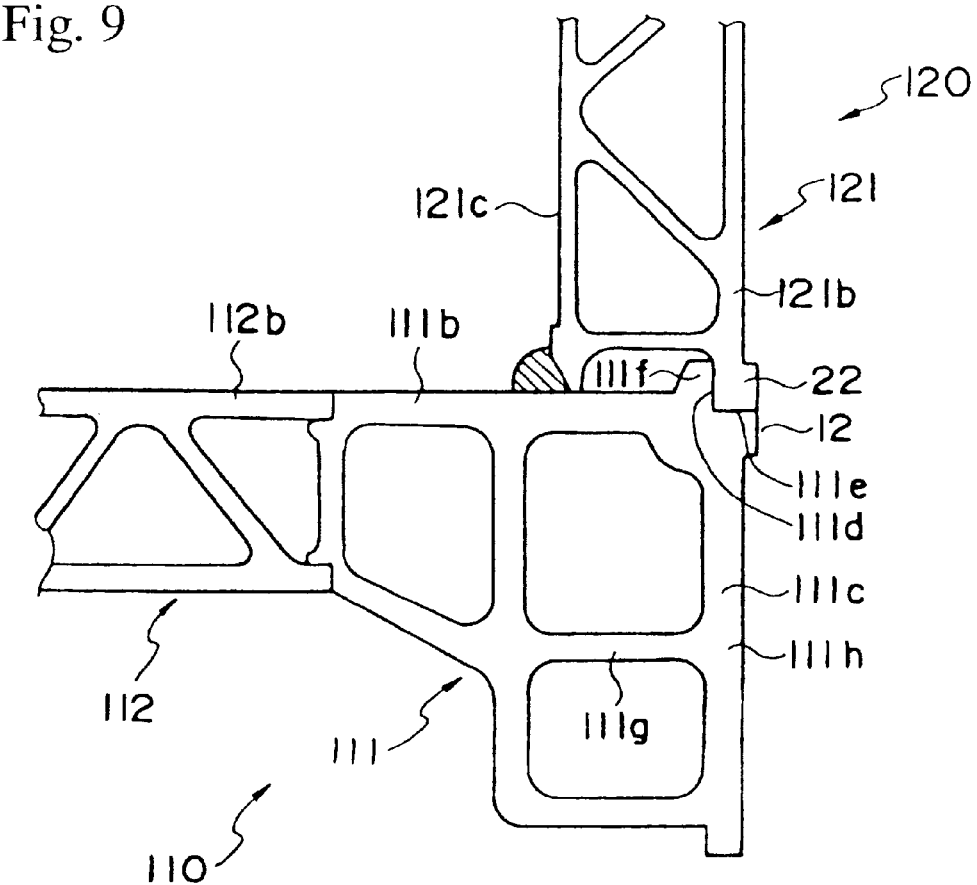
FIG. 9 is a vertical cross-sectional view showing the joint portion between the underframe and the side structure of FIG. 6.

In FIG. 9, the underframe 110 and the side structure 120 are each formed by welding plural hollow members. Each of the surface plates 121b and 121c of the hollow member 121 at the lower end of the side structure 120 are butted to the hollow member 111 at the end of the underframe 110. The hollow member 111 is called a side beam, and the height or the thickness of the plate is greater than the other hollow members 112.

The surface plate 121c facing the interior of the car is mounted on the upper surface plate 111b of the hollow member 111. They are substantially orthogonal. This butted portion is fillet-welded by arc welding from the interior side of the car body.

The surface plate 121b facing the exterior is butted to the recessed portion 111d formed to the upper area of the hollow member 111, and is mounted on the recessed portion 111d. This butted portion is friction stir welded from the exterior side of the car body.

The recessed portion 111d exists on the hollow member 111 between the upper surface plate 111b and the perpendicular plate 111c facing the exterior side. The recessed portion 111d is opened both to the upper direction and to the outer direction. The recessed portion hid is provided with a protruding block 111f protruding upward. The protruding block 111f adjoins the back side of the surface plate 121b.

The center of thickness of the circular saw 61, that is, the extension of axial center of the rotary tool 80, is within the range of the thickness of the surface plate 111b. This enables the load when performing the friction stir welding to be supported by the surface plate 111b, thereby preventing the deformation of the joint portion, and enabling a good weld.

The upper surface plates 111b and 112b of the hollow member 111 and 112 of the underframe 110 are substantially positioned on the same plane. The exterior side of the lower end of the surface plate 121b and the exterior side of the upper end of the connecting plate 111c are each provided with protrusions 12, 22, respectively.

The structure of the joint portion between the left side structure 120 and the underframe 110 is identical to that explained above.

The welding steps will now be explained. The underframe 110 is mounted on the base 210, and side structures 120, 120 are mounted on top, with supporting devices 230 and 240 fixing the side structures to the predetermined position. Then, the underframe 110 and the side structures 120, 120 are tack-welded intermittently both from the interior and exterior of the car. Next, the surface plates 121b and 111b are arc-welded from the interior side of the car.

Next, the left and right welding devices 300, 300 are driven in synchronism, and welding is performed in synchronism. The circular saw 61 of the welding device 300 forms a groove 40 to the joint portion into which is positioned the filling material 30, before performing the friction stir welding.

The cutting of the groove (gap) 40 is started from the longitudinal end portion of the car body using the circular saw 61. After forming a groove 40 of predetermined length, the movement of the track 310 is stopped, and filling material 30 is reeled off from the drum 90 and inserted to the groove 40.

Next, the filling material 30 inserted to the groove 40 is tack-welded to the protrusions 12 and 22. The welding position is at the starting end of the filling material 30 inserted to the groove 40. Next, the roller 70 is protruded toward the groove 40 at a predetermined position, and the movement of the track is started. The cutting is also resumed. At the same time the inserting of the filling material 30 to the groove 40 is started, the roller 70 starts to fix the material 30 to position.

When the rotary tool 80 of the friction stir welding device moves to the position where the joint line starts, the movement of the track 310 is stopped. While rotating the rotary tool 80, the tool 80 is inserted to the portion to be welded. Next, the movement of the track 310 is resumed.

The welding devices 300 and 300 on the left and right sides of the car body are moved in synchronism when performing the friction stir welding. In other words, on the line extending from the axial center of the rotary tool 80 of the right welding device 300 is substantially positioned the axial center of the rotary tool 80 of the left welding device. Between the left and right devices are surface plates 111b and 112b of the underframe 110. Therefore, the large load while performing the friction stir welding is supported by the surface plates, which prevent the underframe from deforming.

However, in general, the axial center of the rotary tool 80 is tilted toward the direction in which it moves. Therefore, the rotary tool 80 will not be positioned on the line extended from the axial center of the other tool 80. In this case, the other rotary tool 80 cannot support the load of one rotary tool 80, but it can support the area surrounding it. Therefore, the friction stir bonding is performed without the underframe being deformed.

In order to support the load of one rotary tool 80 from the other side, a roller is used to support the area extended from the axial center of one rotary tool 80, which is moved in synchronism with said one rotary tool 80. When a plural number of rollers is used, the rollers are positioned along the joint line. Further, a supporting device for supporting the area surrounding the other joint portion is provided. On this other side, the supporting device can be provided without the rotary tool 80. In this case, the support device supports either the joint portion or a non-joint portion.

It is common to provide a camber to the car body. When a camber is formed to the underframe 110, the height of the cutting process and the height of the friction stir welding process is moved up and down according to the camber. In this case, it is preferable to use an end mill instead of the circular saw.

According to the embodiment above, normally the filling material is fixed to position by crimping the protrusions 12 and 22, but it can also be fixed by welding predetermined intervals thereof. The welding position is set between the circular saw 61 and the guide 95.

The welding of the surface plate 121b of the hollow member 121 and the surface plate 111c of the hollow member 111 is performed at the connecting portion 111h provided between the surface plate 111c and the connecting plate 111g that connects the substantially parallel two surface plates (one is 111c). The surface plate 111c above the connecting portion 111h is recessed so that the surface plate 121b can fit thereto. Thereby, the lower end of the surface plate 121b is butted to the surface plate 111c positioned below the connecting portion 111h. The connecting plate 11c is positioned along the line extended from the axial center of the rotary tool 80. This supports the load of the rotary tool. The end portion of the surface plate 121c is welded onto the surface plate 111b.

Figure 10:
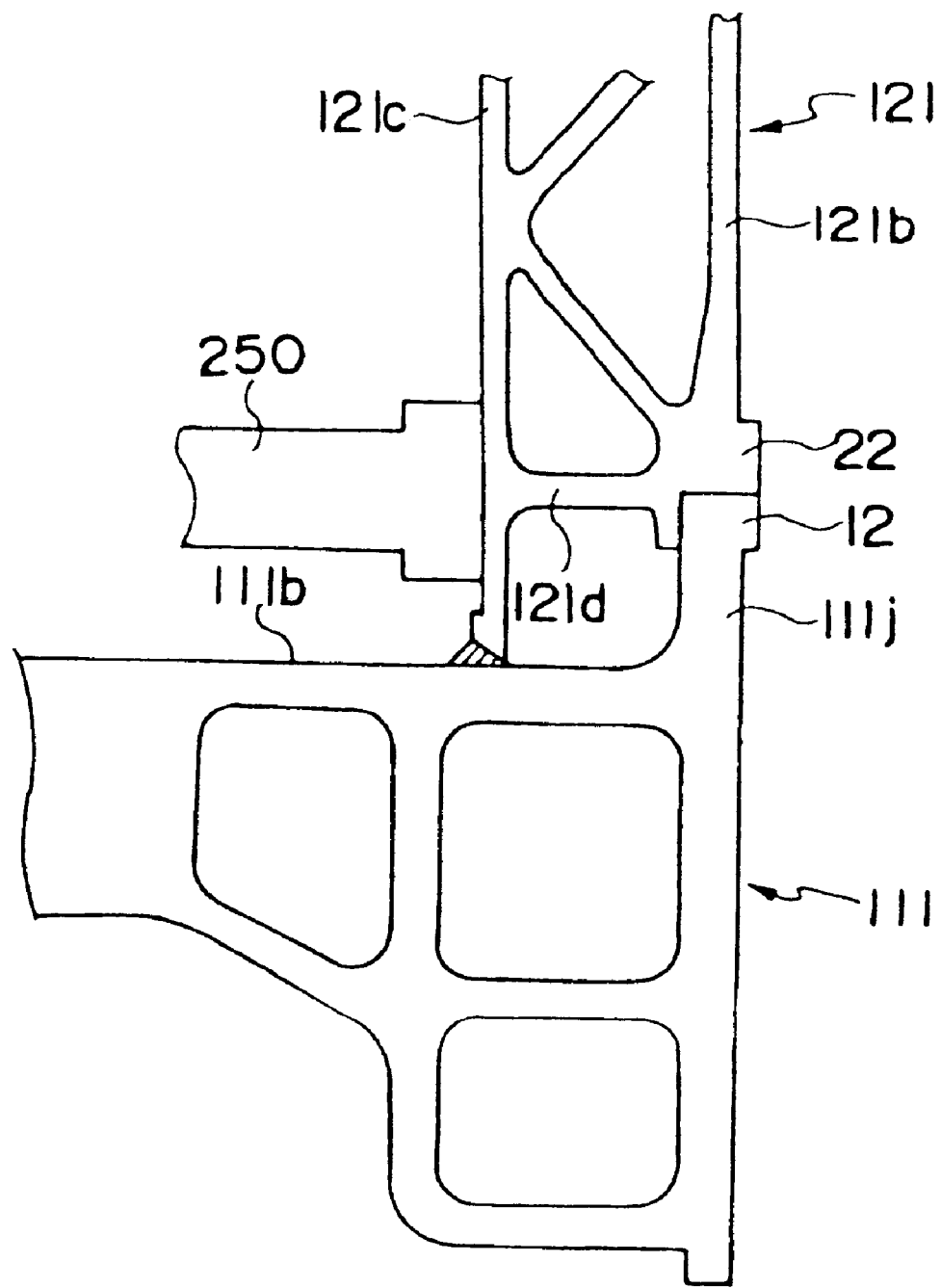
FIG. 10 is a drawing corresponding to FIG. 9 according to another embodiment of the present invention.

The embodiment of FIG. 10 will be explained. On the external side of the hollow member 111 at the end of the underframe 110 is a block (corresponding to the surface plate) 111j protruding upward. This is butted against the external-side surface plate 121b of the hollow member 121 of the side structure. On the back side of the butted portion of the block 111j and the surface plate 121b is positioned the connecting plate 121d that connects the inner and outer surface plates 121b and 121c. The connecting plate 121d is substantially orthogonal to the surface plates 121b and 121c. Therefore, the connecting plate 121d is positioned along the line extending from the axial center of the rotary tool 80 during welding. At the joint portion between the connecting block 121d and the surface plate 121b exists the recessed portion and the protruded block to which the surface plate 121b fits, similar to the former embodiment.

After welding the surface plate 121c and the surface plate 111b together, the supporting device 250 is positioned so as to contact the surface plate 121c. In the embodiment, plural supporting devices 250 are positioned along the longitudinal direction of the car body. The supporting device can expand and contract freely. Next, friction stir welding is performed. The load on one rotary tool 80 is transmitted to the side of the other rotary tool 80 via the supporting device 250.

Figure 11:
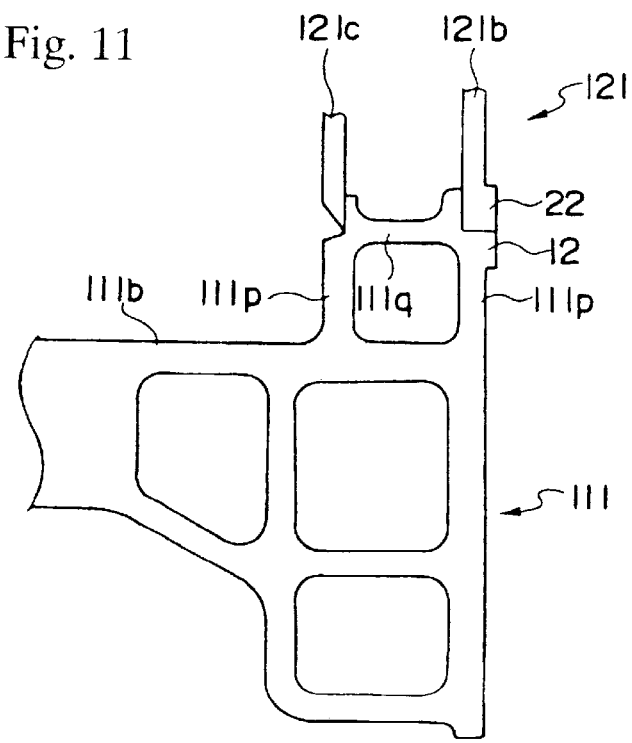
FIG. 11 is a drawing corresponding to FIG. 9 according to yet another embodiment of the present invention.

The embodiment of FIG. 11 will now be explained. Two protruding blocks 111j, 11j are formed on top of the hollow member 111. The two protruding blocks (corresponding to surface plates) 111p, 111p are connected by a connecting block 111q. The connecting block 111q is positioned similar to the connecting block 121d. At the connecting portion between the connecting block 111q and the protruding blocks 111p, 111p are provided a recessed portion and a protruding block to which are fit the surface plates 121b and 121c, similar to the former embodiment.

After welding the surface plate 121c and the protruding block 111p, the supporting device 250 is positioned. The supporting device 250 should preferably contact both the surface plate 121c and the protruding block 111p. The connecting plate 111q is positioned along the line extending from the axial center of the rotary tool 80 when performing the friction stir welding.

According to this embodiment, there is no need of a supporting device 250 if the protruding block 111p is short, since the underframe 110 is sufficiently strong.

Figure 12:
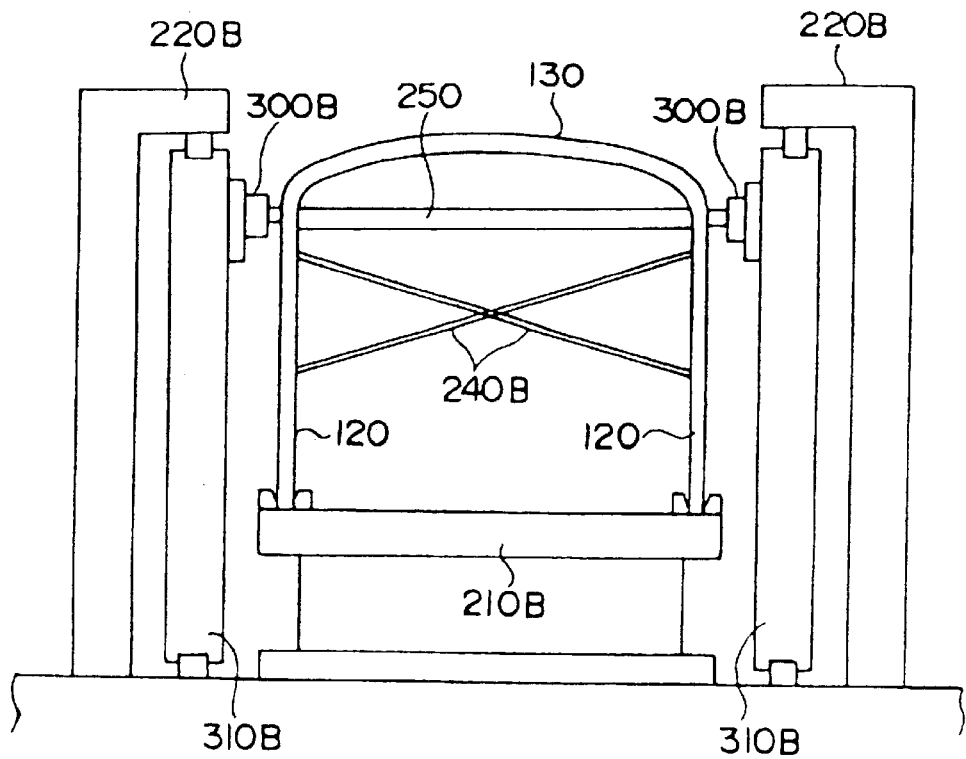
FIG. 12 is a front view showing the welding device according to another embodiment of the present invention.
Figure 13:
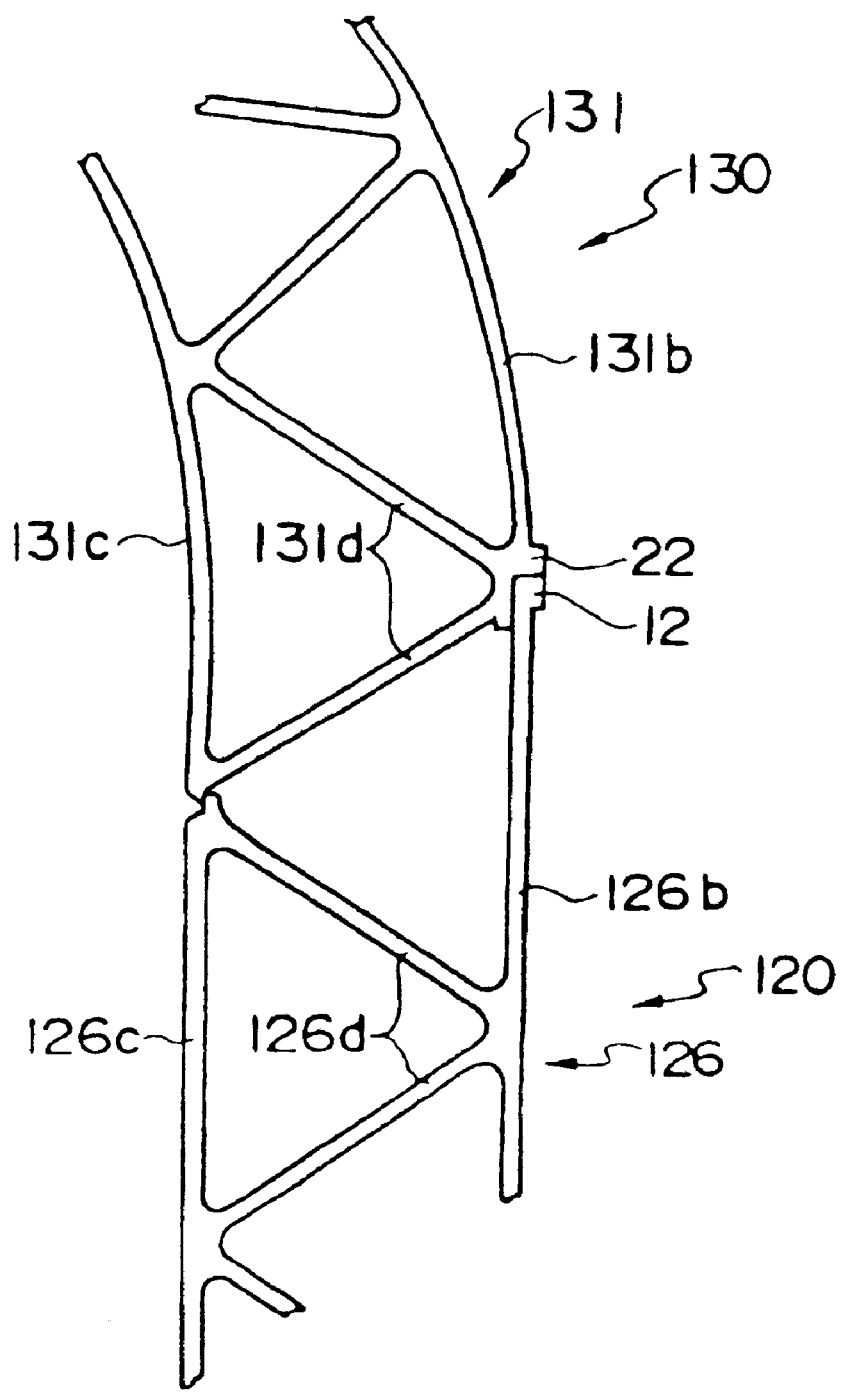
FIG. 13 is a vertical cross-sectional view showing the joint portion between the side structure and the roof structure of FIG. 12.

The embodiment shown in FIGS. 12 and 13 is explained. This embodiment relates to a welding device for welding the roof structure 130 and the side structure 120. The side structures 120, 120 are mounted on a base 210B, and the roof structure 130 is mounted on top. This assembly is supported from the interior and exterior of the car body by the supporting device 230B and 240B. The supporting device 240B supports the roof structure 130 and side structures 120 by pulling or pushing from the interior of the car body. The supporting devices 230B and 240B correspond to the supporting devices 230 and 240 of the former embodiment. Further, the lower end of the side structure 120 is inserted to the recessed portion of the base 210B and thereby being positioned.

After fixing the side structures 120, 120 and the roof structure 130 to position by the supporting device 240B, the butted portion between the side structures 120, 120 and the roof structure is arc-welded from the inside of the car body. After welding, a supporting device 250 is positioned between the left and right welded portions. The supporting device 250 supports the area near the welded portions. The supporting device 250 is a stay bar.

Next, the left and right tracks 310B, 310B are moved as mentioned above, while the welding devices 300B, 300B cut grooves, fill the filling material to the grooves, and perform friction stir welding. The load added during the friction stir welding is supported by the connecting plate 123c and the rotary tool 80 on the other side through the connecting plate 123c at the welded portion and the supporting device 250.

The details of the welded portion between the hollow member 126 at the upper end of the side structure 120 and the hollow member 131 at the lower end of the roof structure 130 will be explained. The hollow member 126 (131) includes two surface plates 126b and 126c (131b and 131c) and connecting plates 126d (131d) arranged in a trussed state. The end of the surface plate 131b and the end of the surface plate 131c are connected by a slanted connecting plate 131d. However, there is no connecting plate connecting the end of the surface plate 126b and the end of the surface plate 126c. Therefore, the end of the surface plate 131c (126b) is protruded further toward the end portion than the surface plate 131b (126c). At the connecting point (junction) between the two connecting plates 131d, 131d and the surface plate 131b is formed a recessed portion similar to the one mentioned in the former embodiment, with a protruding block formed to the back surface thereof. At the connecting point (junction) between the surface plate 126c and the end of connecting plate 126d is also formed a recessed portion as mentioned in the former embodiment, with a protruding block formed to the back surface thereof. The surface plate 126b of the hollow member 126 fits to the recessed portion and the protruding block of the surface plate 131b. The surface plate 131c of the hollow member 131 fits to the recessed portion and the protruding block of the surface plate 126c. The butted portion between the surface plates 126b and 131b facing the exterior of the car is provided with protrusions 12 and 22. The center of thickness of the circular saw 61 and the line extended from the axial center of the rotary tool 80 exists at the cross point of two connecting plates 131d, 131d.

The load added when performing the friction stir welding is transmitted to the surface plate 126c via two connecting plates 131d, 131d. Further, the load is transmitted to the other side structure 120 via the supporting device 250.

Figure 14:
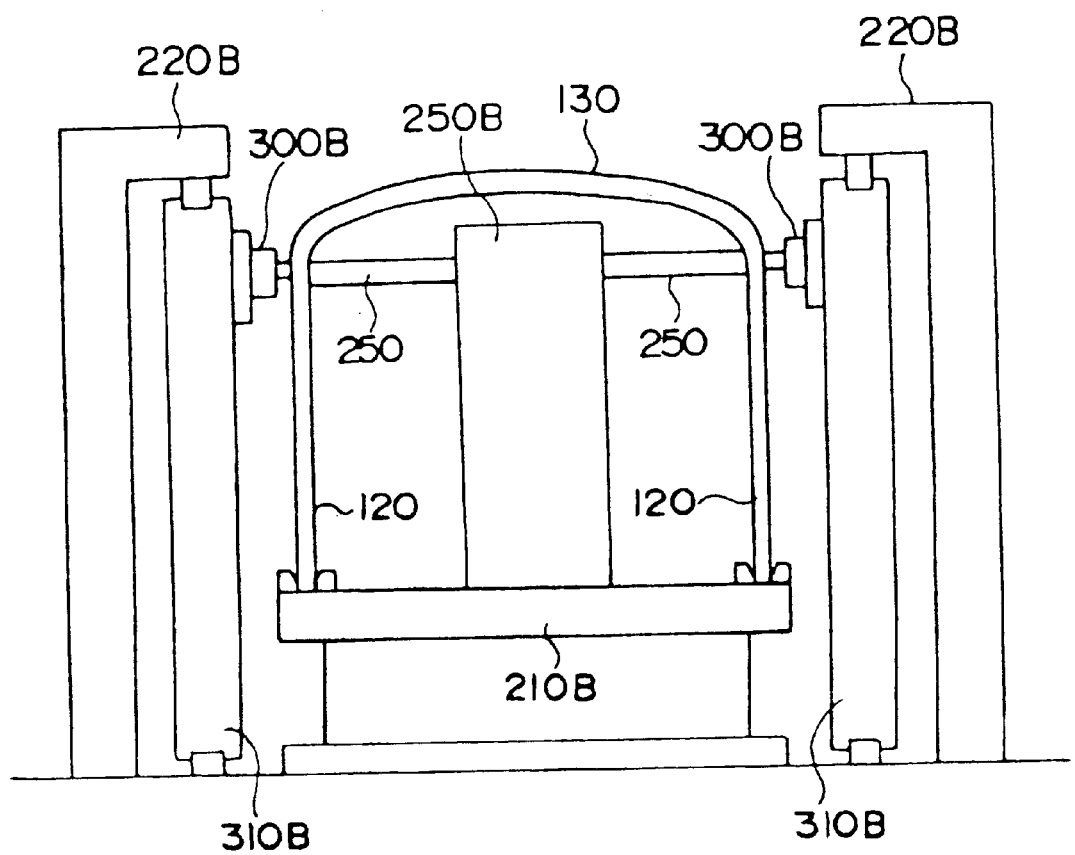
FIG. 14 is a front view showing the joint portion according to another embodiment of the present invention.

The embodiment of FIG. 14 will be explained. A supporting device 250B mounted on a base 210B is placed between the two side structures 120, 120, and the supporting device 250 is mounted thereto. After welding the interior of the car body, the body is supported by the supporting device 250. The supporting device 250 can be equipped with a roller or a rotary tool, as explained in the former embodiment. When the supporting device 250 comprises a roller or rotary tool, it moves in synchronism with the rotary tool 80.

Figure 15:
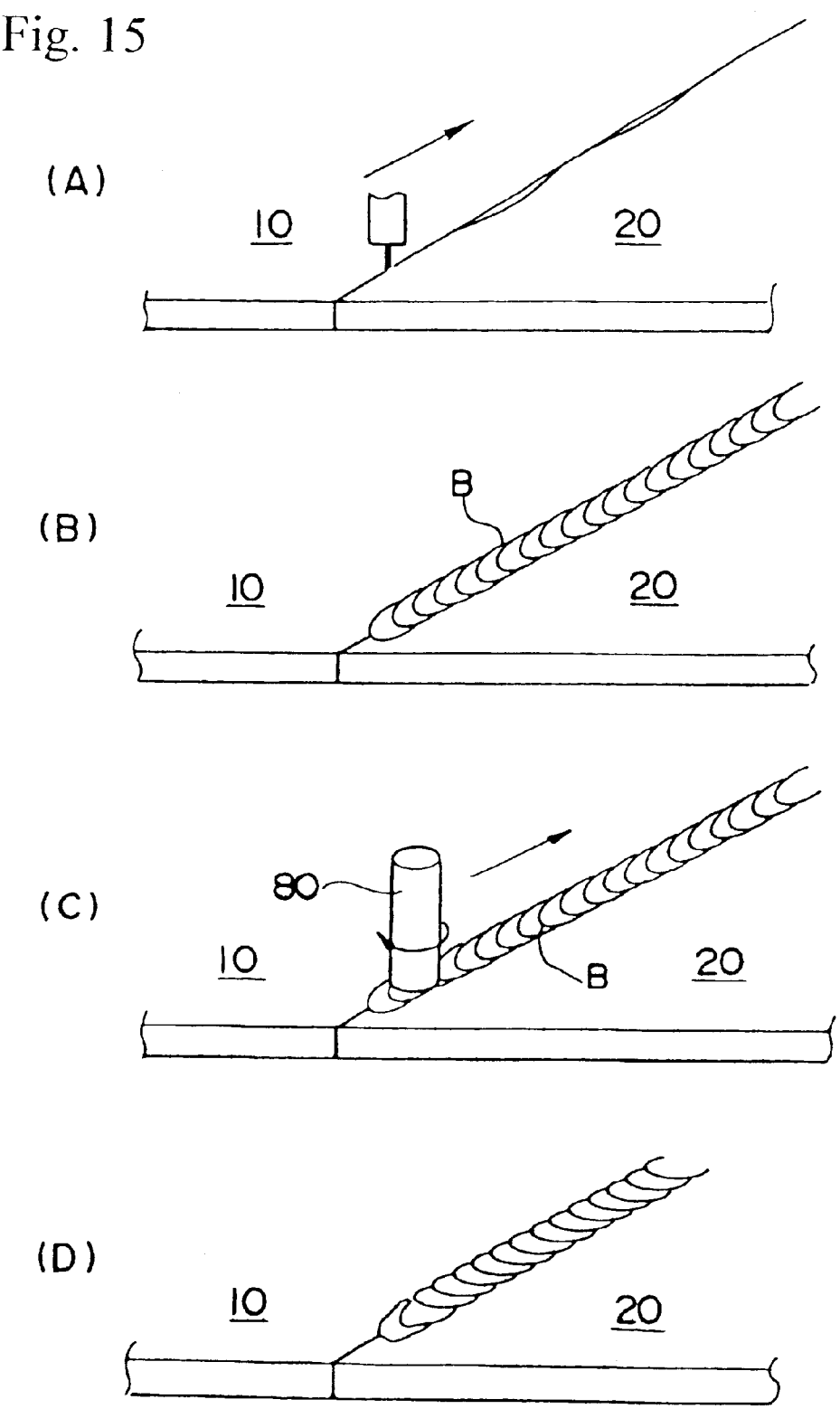
FIG. 15 is a view showing the welding steps according to another embodiment of the present invention.

The embodiment of FIG. 15 will now be explained. Two members 10 and 20 are butted together as mentioned, and arc-welding is performed along the joint line. The welding is performed continuously along the joint line. Especially, the areas having a gap is welded so as to fill the gap as much as possible (FIGS. 15(A), (B)).

Next, friction stir welding is performed using the rotary tool 80. In this case, the nugget B being lifted is used instead of the protrusions 12 and 22. That is, the lower end of the large-diameter portion 81 of the rotary tool 80 is positioned within the lifted nugget B when performing the friction stir welding. Further, the members 10 and 20 can also be provided with protrusions 12 and 22 for welding (FIGS. 15(C), (D)).

The welding is performed to fill the gap with filling material. Essentially, the members are butted together so as not to form any gap, so the butted portion forms an I-type beveling. Therefore, there may not be any nugget (filling material) existing at the lower area of the gap. However, the formed (lifted) nugget B or protrusions 12 and 22 will function as the filling material. The strength of the weld should be at a level preventing the nugget B that is not yet friction-stir-welded from parting by the force of the friction stir welding.

By butting together two members, cutting the same, then moving the members so as to minimize or rid the groove between the two members, they are ready for friction stir welding.

The technical scope of the present invention is not limited to the terms used in the claims or in the summary of the present invention, but is extended to the range in which a person skilled in the art could easily substitute based on the present disclosure.

The present invention provides a good weld by placing a filling material in the gap formed to the butted area between two members before performing friction stir welding thereto.

Further, a good weld is achieved by cutting the butted portion between two members and moving the two members closer before performing friction stir welding thereto.

The friction stir welding between the underframe of the car body and the side structures is performed either by using the surface plate of the underframe as supporting means or by placing a supporting device between the two side structures, which facilitates the welding process.

The friction stir welding between the side structures and the roof structure is performed while arranging a supporting device between the two side structures, which facilitates the welding process.

What is claimed is:

1. A method of manufacturing a car body, comprising:
   mounting side members to both ends of an underframe, respectively; and
   positioning structure substantially on a line extending from an axial center of one rotary tool, for friction stir welding the exterior side of one side member and the exterior side of said underframe, in the following order: a surface plate of said underframe, a joint portion between the exterior side of the other side member and the exterior side of said underframe, and a supporting device for supporting said joint portion from the exterior side, when performing friction stir welding using said rotary tool.

2. A method for manufacturing a car body according to claim 1, wherein:
   said supporting device is a rotary tool for friction stir welding the exterior side of the other side structure and the exterior side of said underframe; and
   said respective rotary tools move along the joint line in synchronism.

3. A method for manufacturing a car body according to claim 1, wherein said supporting device moves along the joint line in synchronism with said rotary tool.

4. A method for manufacturing a car body according to claim 3, including:
   providing a joint area between said underframe and a side structure of a hollow member; and
   welding the interior side of the joint portions between the underframe and said side members before performing the friction stir welding.

5. A method for manufacturing a car body, comprising:
   mounting a side structure to a hollow member on one end of said underframe; and
   while positioning a connecting plate connecting two surface plates of said hollow member substantially on the line extending from the axial center of a rotary tool for friction stir welding the exterior side of said side structure and the exterior side of said hollow member, performing the friction stir welding using said rotary tool.

6. A method for manufacturing a car body, comprising:
   mounting side structures to hollow members constituting both sides of an underframe, respectively; and
   positioning structure substantially on a line extending from an axial center of one rotary tool, for friction stir welding the exterior side of one side structure and the exterior side of one hollow member, in the following order: a connecting plate connecting two surface plates of one of said hollow members, a connecting plate connecting two surface plates of the other hollow member, a joint portion between the exterior side of said side structure and the exterior side of said other hollow member, and a supporting device for supporting said joint portion from the exterior side, when performing friction stir welding using said rotary tool.

7. A method for manufacturing a car body according to claim 6, wherein:
   said supporting device is a rotary tool for friction stir welding the exterior side of said other side structure and the exterior side of said underframe; and
   said rotary tools move along the joint line in synchronism.

8. A method for manufacturing a car body according to claim 6, wherein said supporting device moves along the joint line in synchronism with said rotary tool.

9. A method for manufacturing a car body according to claim 7, including:
   wherein joint areas are provided between said underframe and side structures of said hollow members, respectively; and
   welding the interior side of the joint portions between said underframe and said side structures before performing the friction stir welding.

10. A method for manufacturing a car body, comprising:
    mounting side structures to both ends of an underframe, respectively; and
    positioning structure substantially on a line extending from an axial center of a rotary tool performing friction stir welding, in the following order: an exterior-side joint portion of one side structure and said underframe, the interior side thereof, a first supporting device, the interior-side joint portion of the exterior side of another side structure and said underframe, the joint portion on the exterior side thereof, and a second supporting device for supporting said joint portion from the exterior side, when performing friction stir welding using said rotary tool,
    wherein both ends of said first supporting device contact the interior side of said joint portions, respectively.

11. A method for manufacturing a car body according to claim 10, wherein:
    said second supporting device is a rotary tool for friction stir welding the exterior side of said other side structure and the exterior side of said underframe; and
    said rotary tools move along the joint line in synchronism.

12. A method for manufacturing a car body according to claim 10, wherein said second supporting device moves along the joint line in synchronism with said rotary tool.

13. A method for manufacturing a car body according to claim 10, including:
    wherein joint areas are provided between said underframe and side structures of hollow members, respectively;
    welding the interior sides of the joint portions between said underframe and said side structures;
    positioning said first supporting device; and
    performing said friction stir welding.

14. A method for manufacturing a car body, comprising:
    mounting a roof structure on two side structures; and
    positioning structure substantially on a line extending from an axial center of a rotary tool performing friction stir welding, in the following order: an exterior-side joint portion of one side structure and said roof structure, the interior side thereof, a first supporting device, the interior-side joint portion of the exterior side of another side structure and said roof structure, the joint portion at the exterior side thereof, and a second supporting device for supporting said joint portion from the exterior side, when performing friction stir welding using said rotary tool,
    wherein both ends of said first supporting device contact the interior side of said joint portions, respectively.

15. A method for manufacturing a car body according to claim 14, wherein:
    said second supporting device is a rotary tool for friction stir welding the exterior side of said other side structure and the exterior side of said roof structure; and
    said rotary tools move along the joint line in synchronism.

16. A method for manufacturing a car body according to claim 14, wherein said second supporting device moves along the joint line in synchronism with said rotary tool.

17. A method for manufacturing a car body according to claim 14, including:
- wherein joint areas are provided between said roof structure and side structures of hollow members, respectively;
- welding the interior sides of the joint portions between said roof structure and said side structures;
- positioning said first supporting device; and
- performing said friction stir welding.

18. A method for manufacturing a car body, comprising:
- mounting a roof structure on two side structures;
- positioning structure substantially on a line extending from an axial center of a rotary tool performing friction stir welding, in the following order: an exterior-side joint portion of one side structure and said roof structure, and a supporting device for supporting said joint portion from the interior side; and
- performing the friction stir welding using said rotary tool while moving said rotary tool and said supporting device in synchronism along a joint line.

19. A method for manufacturing a car body according to claim 18, including:
- wherein joint areas are provided between a roof structure and side structures of hollow members, respectively;
- welding the interior sides of the joint portions between said roof structure and said side structures; and
- performing said friction stir welding.

20. A method for manufacturing a car body, comprising:
- mounting a first component of said car body to a second component thereof, said first component being a side structure of the car body; and
- positioning structure of the first component and the second component such that, when friction stir welding an end of the first component to an end of the second component using a rotary tool having an axial center, support structure is provided to support a joint portion between said end of the first component and said end of the second component, said support structure being along said axial center of said rotary tool.

21. A method for manufacturing a car body according to claim 20, wherein said second component is a hollow member of an underframe of the car body.

22. A method for manufacturing a car body according to claim 20, wherein said second component is a roof structure of the car body.

23. A method for manufacturing a car body according to claim 20, wherein the structure of the first and second components are positioned such that said friction stir welding is performed from an exterior side of the car body.

24. A method for manufacturing a car body according to claim 23, wherein said support structure is another rotary tool supporting the second component from an exterior side of a second side structure at an end of the second component opposite that adjacent the first component.

25. A method for manufacturing a car body according to claim 20, wherein said support structure is another rotary tool supporting the second component from an exterior side of a second side structure at an end of the second component opposite that adjacent the first component.

* * * * *